US006920503B1

(12) United States Patent
Nanji et al.

(10) Patent No.: US 6,920,503 B1
(45) Date of Patent: Jul. 19, 2005

(54) TUNNEL INTERWORKING

(75) Inventors: Suhail Nanji, San Jose, CA (US);
William Palter, Santa Cruz, CA (US)

(73) Assignee: Redback Networks Inc., San Jose, CA (US)

(*) Notice: Subject to any disclaimer, the term of this patent is extended or adjusted under 35 U.S.C. 154(b) by 814 days.

(21) Appl. No.: 09/699,228

(22) Filed: Oct. 28, 2000

(51) Int. Cl.$^7$ .............................................. G06F 15/16
(52) U.S. Cl. .................... 709/230; 709/202; 709/206; 709/223; 709/236; 709/238; 709/245; 370/351; 370/353; 370/389; 370/401; 455/466
(58) Field of Search ................................ 709/223, 227, 709/228, 230

(56) References Cited

U.S. PATENT DOCUMENTS

| | | | | | |
|---|---|---|---|---|---|
| 5,826,023 | A | * | 10/1998 | Hall et al. | 709/206 |
| 6,108,345 | A | * | 8/2000 | Zhang | 370/445 |
| 6,108,350 | A | * | 8/2000 | Araujo et al. | 370/467 |
| 6,212,561 | B1 | * | 4/2001 | Sitaraman et al. | 709/225 |
| 6,421,714 | B1 | * | 7/2002 | Rai et al. | 709/217 |
| 6,456,845 | B1 | * | 9/2002 | Drum et al. | 455/424 |
| 6,466,964 | B1 | * | 10/2002 | Leung et al. | 709/202 |
| 6,469,998 | B1 | * | 10/2002 | Burgaleta Salinas et al. | 370/338 |
| 6,519,254 | B1 | * | 2/2003 | Chuah et al. | 370/389 |
| 6,523,068 | B1 | * | 2/2003 | Beser et al. | 709/238 |
| 6,578,084 | B1 | * | 6/2003 | Moberg et al. | 709/236 |
| 6,608,832 | B2 | * | 8/2003 | Forslow | 370/353 |
| 6,636,502 | B1 | * | 10/2003 | Lager et al. | 370/352 |
| 6,701,358 | B1 | * | 3/2004 | Poisson et al. | 709/223 |
| 6,707,809 | B1 | * | 3/2004 | Warrier et al. | 370/351 |

OTHER PUBLICATIONS

W. Townsley, A. Valencia, A. Rubens, G. Pall, G. Zorn, and B. Palter, Layer Two Tunneling Protocol "L2TP", pp., 1–69, RFC 2661, The Internet Society, Aug. 1999.
A. Valencia, M. Littlewood, and T. Kolar, Cisco Layer Two Forwarding (Protocol) "L2F", pp. 1–26, RFC 2341, The Internet Society, May 1998.

* cited by examiner

*Primary Examiner*—Hosain Alam
*Assistant Examiner*—Micheal Y Won
(74) *Attorney, Agent, or Firm*—Blakely, Sokoloff, Taylor & Zafman LLP

(57) ABSTRACT

A method and apparatus for tunnel interworking is described. A computer implemented method comprises receiving a subscriber session with a first tunneling protocol and switching the subscriber session out with a second tunneling protocol.

27 Claims, 6 Drawing Sheets

TUNNEL INTERWORKING

BACKGROUND OF THE INVENTION

1. Field of the Invention

This invention relates to communication networks. More specifically, the present invention relates to interworking communication protocols.

2. Description of the Related Art

Virtual private networks (VPNs) have became a solution for extended corporate networks. VPNs are implemented with tunneling protocols. Tunneling protocols are also employed in the wholesale business model of a network provider. Tunneling conceals an Internet Service Provider's (ISP's)customer's network traffic from the network provider servicing the ISP. Protocols for tunneling evolve with changing requirements and technology. Moreover, new tunneling protocols are introduced with improvements over older protocols. Business decisions can lead companies to either select or reject a given protocol.

For example, the most popular tunneling protocol to implement VPNs currently is the Layer 2 Tunneling Protocol (L2TP). In addition, certain Internet Service Providers (ISPs) have made a decision to implement L2TP in their networks. A network provider, such as a telecommunications company (telecom), servicing corporations utilizing VPNs or ISPs selecting L2TP as the tunneling protocol of choice must conform to the selection or not service customers choosing L2TP.

FIG. 1 (Prior Art) illustrates a network provider only servicing an ISP customer with a specific tunneling protocol and not servicing a different ISP selecting a different tunneling protocol. As FIG. 1 illustrates, subscribers 101 access networks through a network provider 103. The network provider 103 can be any telecom or carrier. The network provider typically has numerous network elements such as routers, hubs, switches, subscriber management systems, etc. In FIG. 1, one of the telecom's network elements 105 is illustrated. The network element 105 can terminate the sessions from the subscribers 101 and tunnel the subscriber sessions to an ISP 109. The tunnel 107 between the network provider 103 and the ISP 109 is a tunneling protocol supported at the telcom's network element 105 and the ISP's network element 111. A different ISP 113 employs a different tunneling protocol on its network element 115. The ISP terminates a tunnel 117 from a different network provider which supports the tunneling protocol selected by the ISP 113. The network provider 103 cannot service the ISP 113 as a customer unless it supports the ISPs selected tunneling protocol.

FIG. 2A (Prior Art) illustrates session switching. In FIG. 2A, a network element 201 establishes a tunnel 203 to another network element 205 which is the tunnel endpoint. In this example, the tunnel 203 carries a subscriber session 202. The subscriber session 202 is tunneled again from network element 205 to a network element 209. The tunnel 207 between the network elements 205 and 209 is implemented with the same tunneling protocol as the tunnel between network elements 201 and 205. The network element 209 terminates the subscriber session.

FIG. 2B (Prior Art) illustrates the network element 205 of FIG. 2A switching the subscriber session 202 with the same tunneling protocol. As illustrated by FIG. 2B, the tunnel 201 of FIG. 2A is terminated at the network element 205. The subscriber session 202 first goes through an authorization sequence. A forwarding process 215 processes a first packet or control packet. A tunnel decapsulation routine 217 in the forwarding process 215 decapsulates the control packet from tunnel encapsulation. The decapsulated packet is then processed by a session decapsulation routine 216. The control packet is then processed by a payload decapsulation routine 219. Control information (e.g., subscriber, domain, etc.) from the control packet is passed to a control process 221. The control process 221 determines if the subscriber transmitted over the session 202 is authorized on the network element. For authorized subscribers, the control process 221 directs the forwarding process 215 how to handle traffic from the session 202. After a control packet is received, data packets begin to arrive at the network element. The data packets are L2TP data packets encapsulating data payloads. If the session 202 is to be tunneled out, then the forwarding process 215 no longer passes payloads to the payload decapsulation routine 219. Instead, after the session decapsulation routine 216, payloads from the session 202 are passed to a session encapsulation routine 218 and then to a tunnel encapsulation routine 223. After tunnel encapsulation, the payloads for session 202 are transmitted out another session 204 through the tunnel 207.

A network provider could update their systems to support new tunneling protocols if a network provider would be willing to send people out to the field to update all of their functioning systems. After updating their systems to support the new tunneling protocol, the network provider would have to recertify all of their systems to comply with telecom regulations. Whenever a new tunneling protocol becomes a solution or a valued customer selects an unsupported protocol, the network provider would have to repeat these tasks. Session switching can terminate a session coming over a first tunnel and switch the session to be transmitted out another tunnel, but session switching is limited to the same tunneling protocol.

SUMMARY OF THE INVENTION

The invention provides an apparatus and method for tunnel interworking. A method for switching a subscriber session from a first tunneling protocol to a second tunneling protocol is provided herein.

In one embodiment of the invention, a subscriber session is received with a first tunneling protocol. According to the invention, if the subscriber session is to be transmitted with a second tunneling protocol then a session structure is created indicating the second tunneling protocol. The session is transmitted as indicated by the session structure.

In an alternative embodiment of the invention, a subscriber session is received with a first tunneling protocol. The session is includes data packets encapsulated with the first tunneling protocol. A payload is decapsulated from the data packets and the payload is decapsulated. A subscriber is indicated by the decapsulated payload and a set of data is retrieved corresponding to the subscriber. The set of data indicates the subscriber session is to be transmitted out a different tunnel with a different tunneling protocol. The different tunneling protocol is selected and the payloads are encapsulated with the different tunneling protocol directly after being decapsulated from the first tunneling protocol.

These and other aspects of the present invention will be better described with reference to the Detailed Description of the Preferred Embodiment and the accompanying Figures.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE DRAWINGS

The present inventions provides for interworking a session between different tunneling protocols. In the following description, numerous specific details are set forth to provide a thorough understanding of the invention. However, it is understood that the invention may be practiced without these specific details. In other instances, well-known protocols, structures and techniques have not been shown in detail in order not to obscure the invention.

Figure 1:
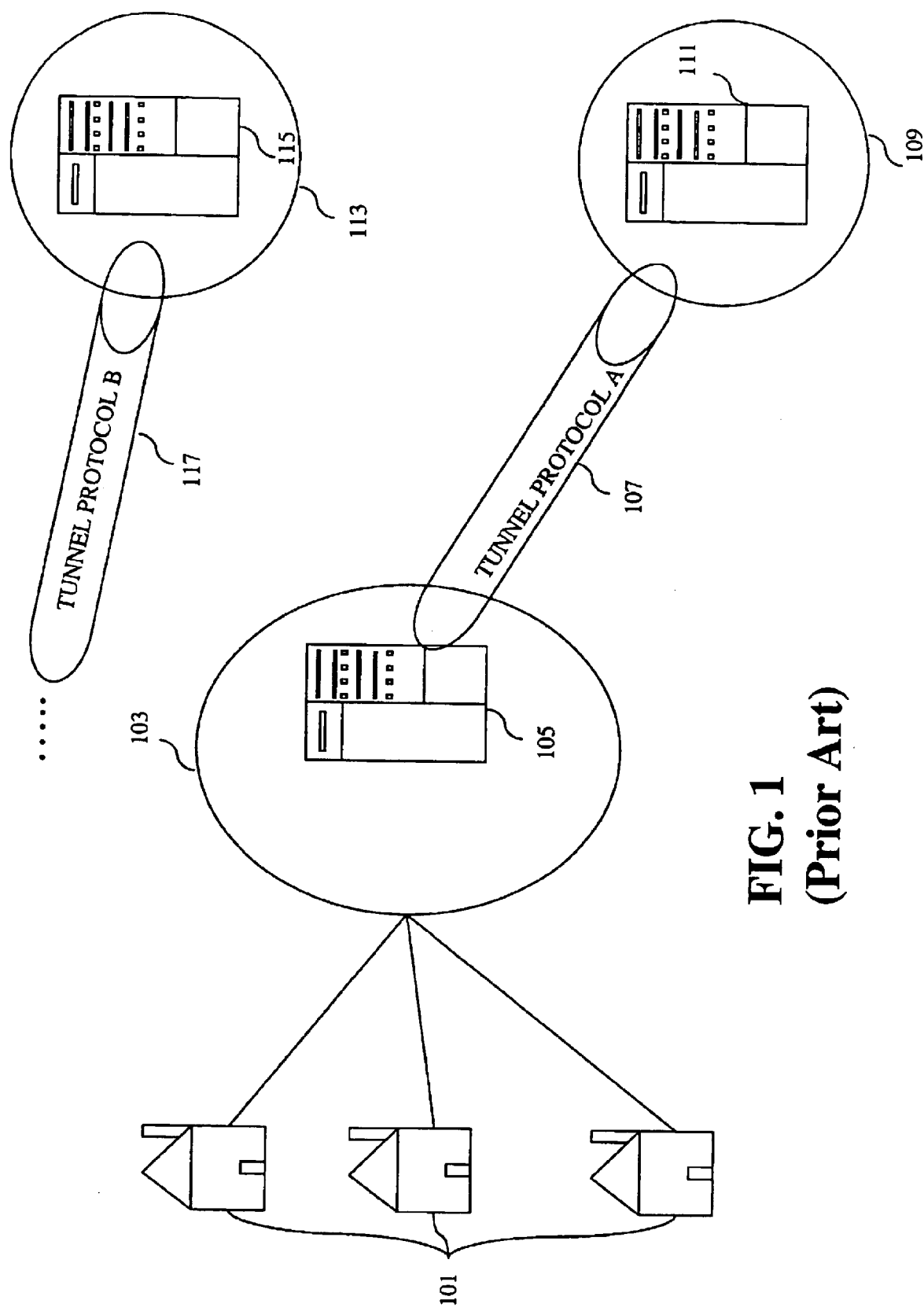
FIG. 1 (Prior Art) illustrates a network provider only servicing an ISP customer with a specific tunneling protocol and not servicing a different ISP selecting a different tunneling protocol.
Figure 2A:
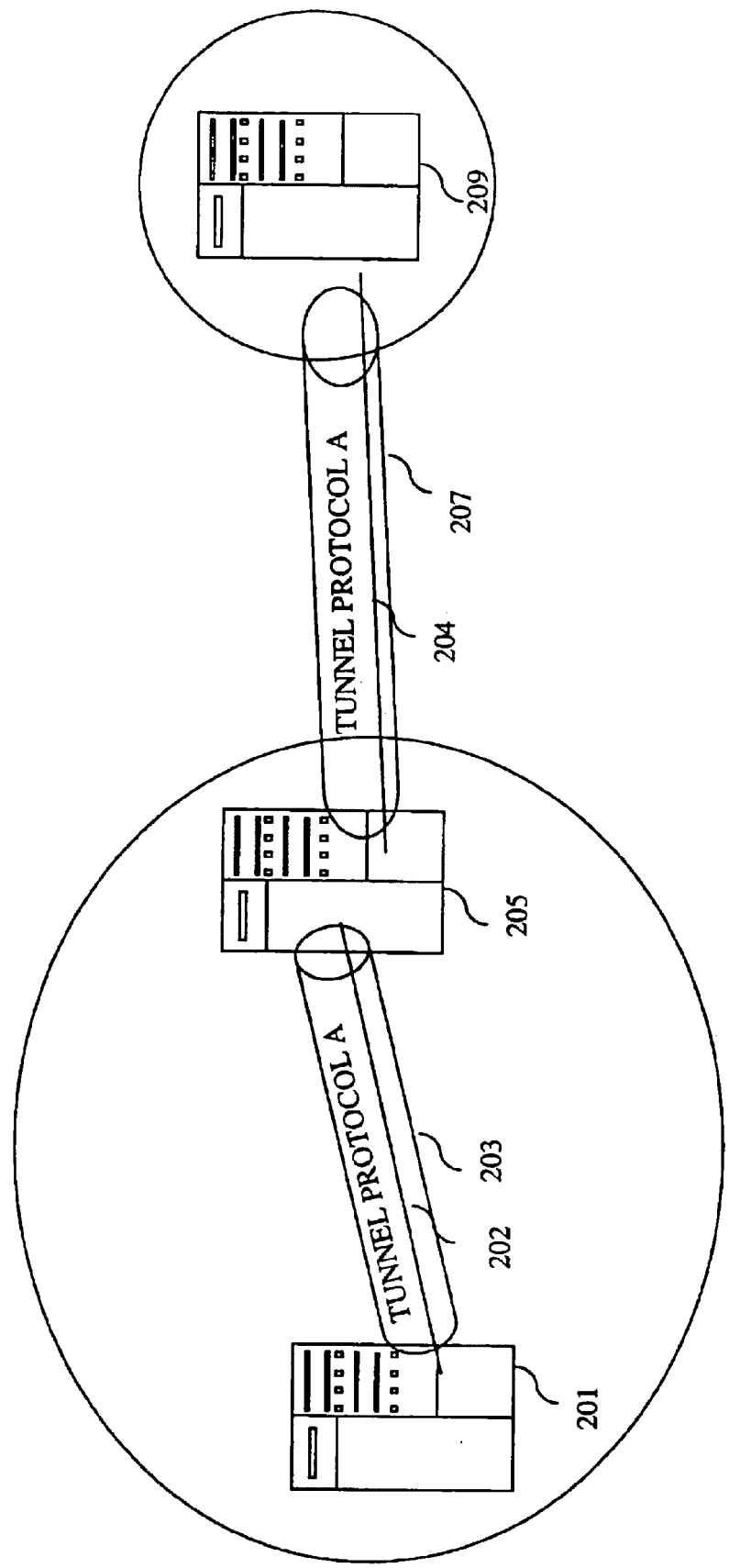
FIG. 2A (Prior Art) illustrates session switching.
Figure 2B:
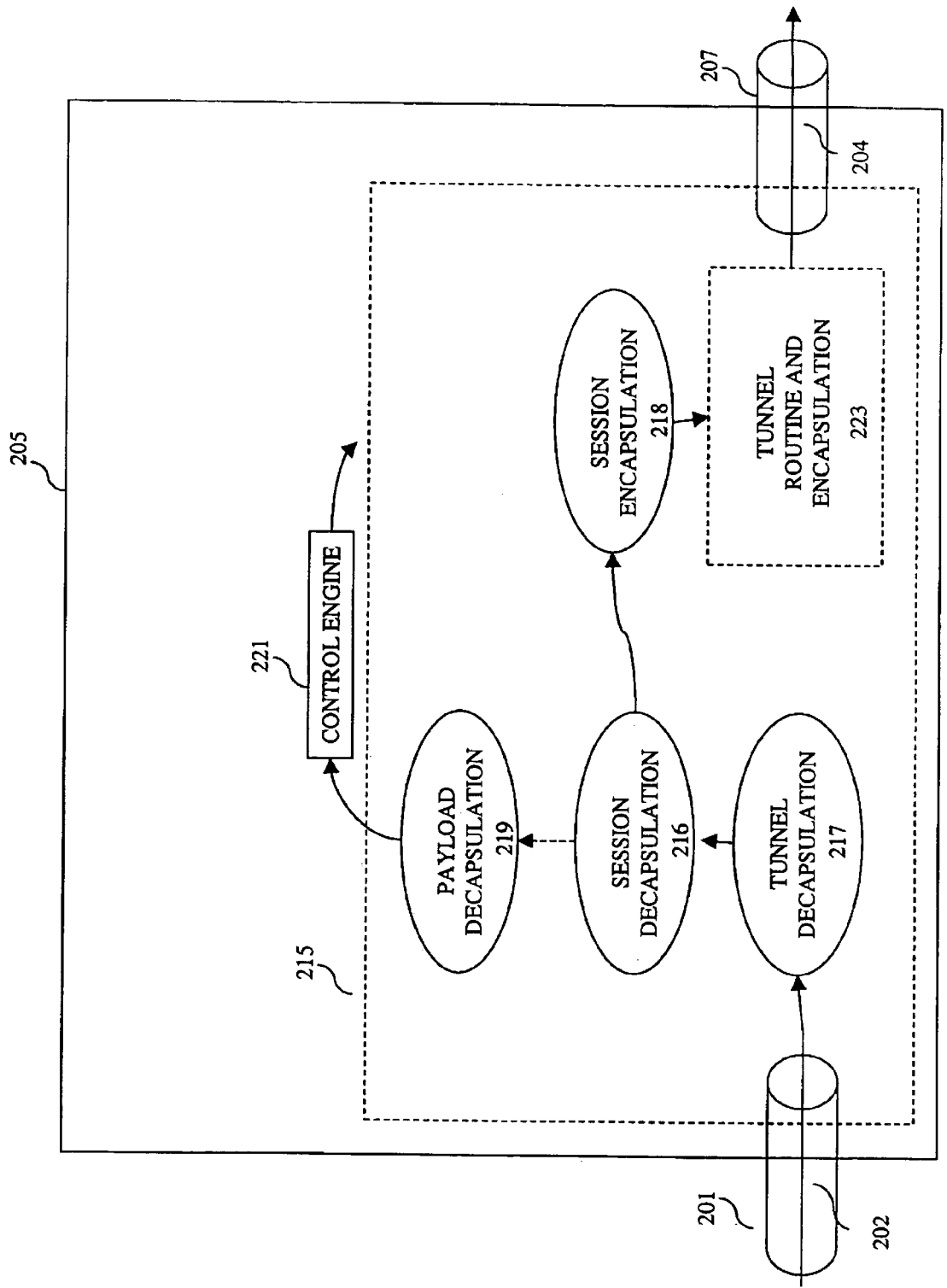
FIG. 2B (Prior Art) illustrates the network element 205 of FIG. 2A switching the subscriber session 202 with the same tunneling protocol.
Figure 3A:
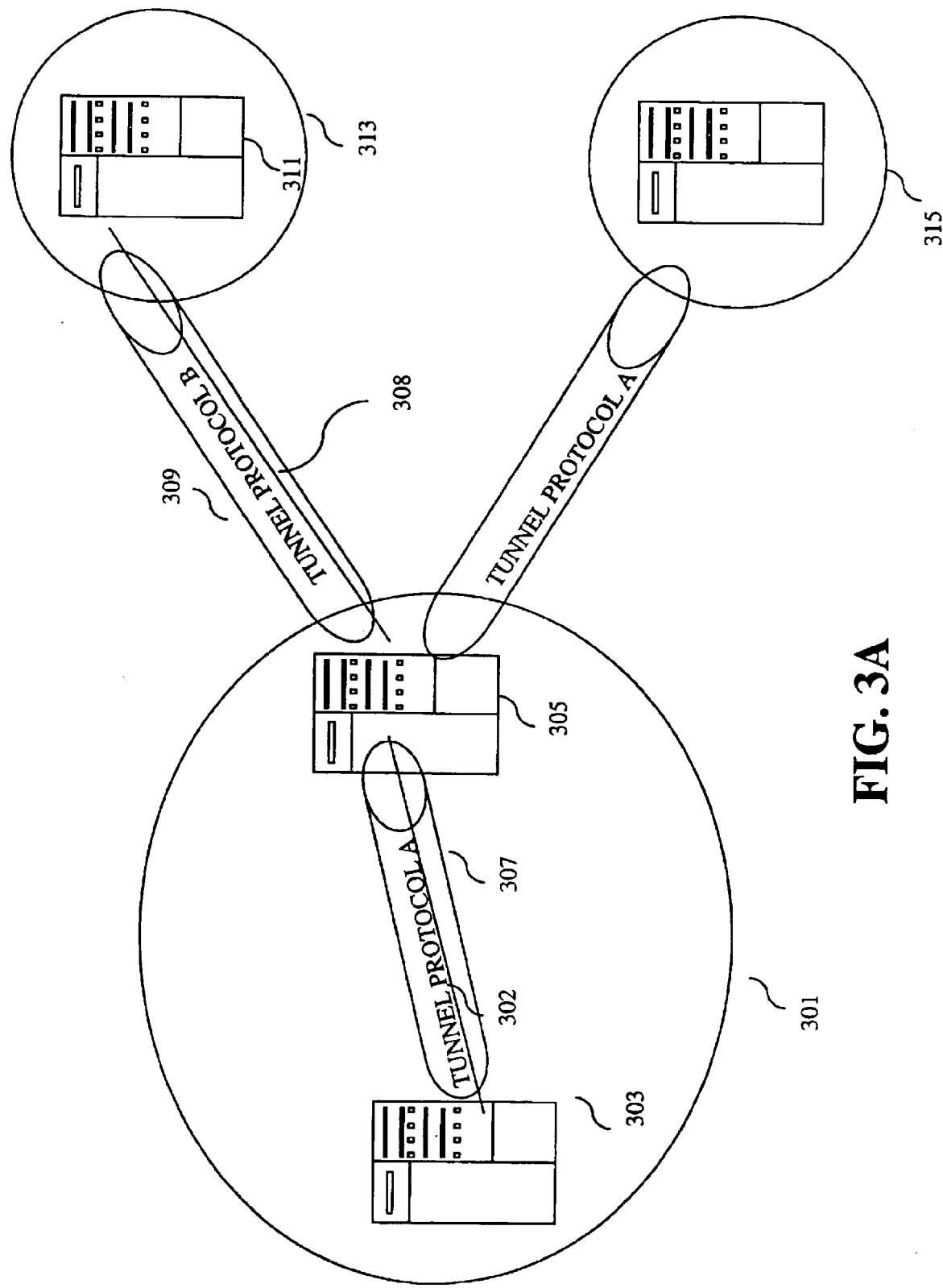
FIG. 3A is a diagram illustrating a network element switching a subscriber session from one tunneling protocol to a different tunneling protocol according to one embodiment of the invention.

FIG. 3A is a diagram illustrating a network element switching a subscriber session from one tunneling protocol to a different tunneling protocol according to one embodiment of the invention. In the example of FIG. 3A, a network provider 301 owns two network elements 303 and 305. The network element 303 originates a tunnel 307 which is terminated at the network element 305. The tunnel 307 is implemented with a tunneling protocol A (such as PPTP, L2F, L2TP, etc.). The network element 303 may only support tunneling protocol A. A subscriber session 302 is transmitted over the mandatory tunnel (i.e., a tunnel not generated by a subscriber) 307 from network element 303 to network element 305. In an alternative embodiment, the tunnel 307 could be generated from a subscriber (i.e., a voluntary protocol).

The network element 305 determines the destination network element for the session 302. In the example of FIG. 3A, the network element 305 is selecting an ISP 315 or an ISP 313. As illustrated, the network element 305 determines that the session 302 is to be transmitted over another tunnel to the ISP 313. The ISP 313 supports the tunneling protocol B which is a different tunneling protocol than tunneling protocol A. The network element 305 establishes a tunnel 309 to the ISP's network element 311 with tunneling protocol B. The session 302 is switched to a session 308 and transmitted over the tunnel 309 to the ISP 313. Thus, the network element 305 owned by the network provider 301 can switch an incoming session to either ISP 315 or ISP 313 independent of the tunneling protocol being supported by either ISP.

It should be understood other situations in which tunnel interworking can be used are within the scope of the invention. For example, one or more of the network elements owned by the ISPs 313 and 315 may instead be owned by the network provider. As another example, the network element 311 need not terminate the circuit, but may transmit the session to yet another network element through another tunnel. As another example, the network elements 311 may be owned by an entity other than a ISP (e.g., a corporation). As another example, the network element 303 may not be owned by the network provided.

Figure 3B:
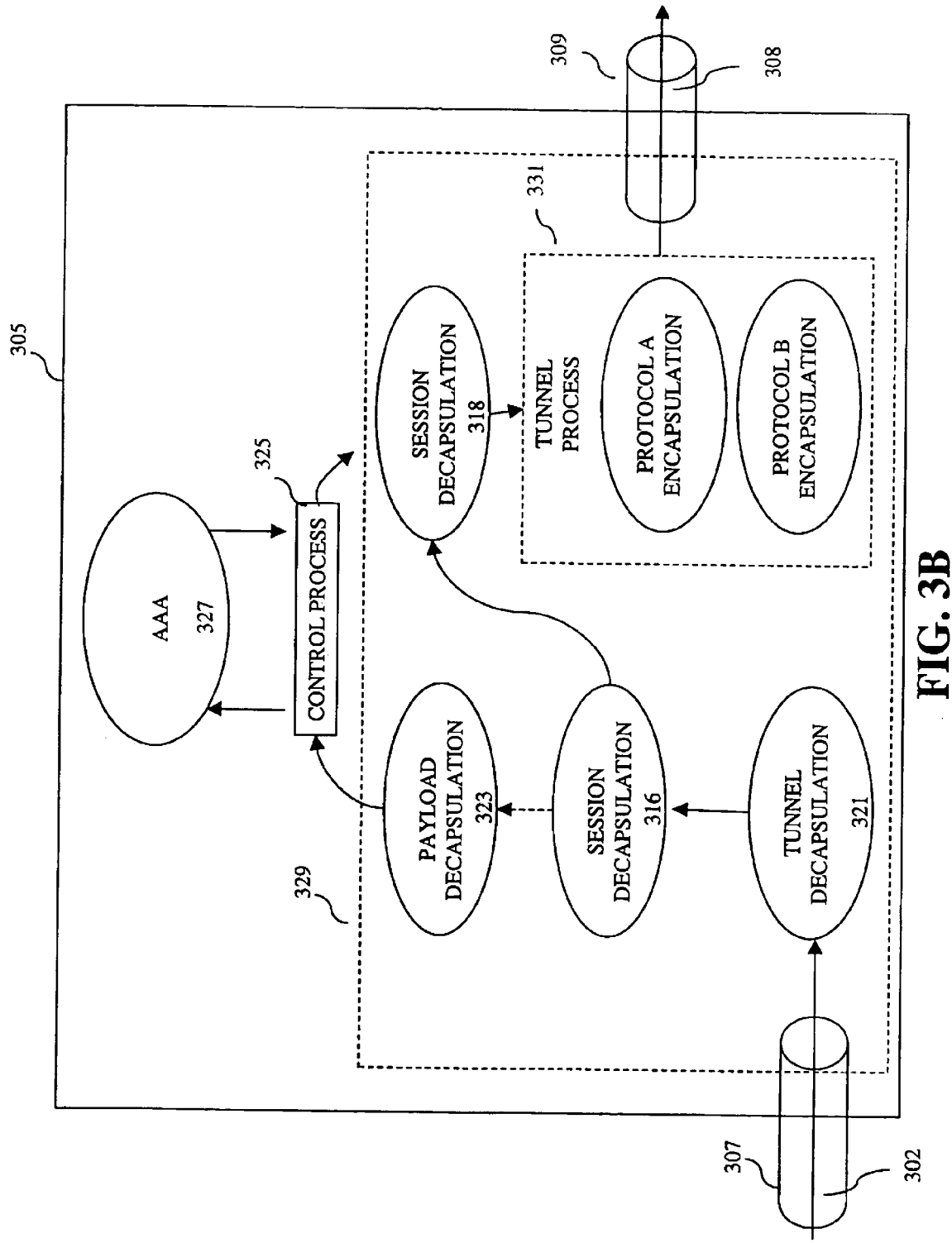
FIG. 3B is a diagram illustrating the network element 305 of FIG. 3a switching the session 302 from the tunnel 307, out the tunnel 309 with a different tunneling protocol according to one embodiment of the invention.

FIG. 3B is a diagram illustrating the network element 305 of FIG. 3a switching the session 302 from the tunnel 307, out the tunnel 309 with a different tunneling protocol according to one embodiment of the invention. As illustrated by FIG. 3B, the network element 305 of FIG. 3A receives the subscriber session 302 over the incoming tunnel 307. The subscriber session 302 includes a series of packets, each packet having a payload. The first packet in the series of packets is a control packet for authenticating a subscriber. A control process 325 receives data from an authentication process 327. The data for the subscriber will indicate that the session 302 is to be transmitted out the tunnel 309. The data also indicates the tunneling protocol for the tunnel 309 which is different than the protocol of the tunnel 307. Control process 325 commands the forwarding process 329 to switch the session 302 out the egress tunnel 309 and indicates the different tunneling protocol for tunnel 309. Upon receiving the command, the forwarding process 329 sends the decapsulated payloads from the session 302 directly from the session decapsulation 316 to a session decapsulation 318. The session decapsulation routine 381 passes traffic to a tunnel routine 331.

In the example illustrated by FIG. 3B, only two tunneling protocols are illustrated although any number of tunneling protocols can be supported by the network element 305. Tunnel routine 331 selects the protocol encapsulation routine indicated by the control process 325 and encapsulates the decapsulated payloads with the selected tunneling protocol. For example, if the ingress tunnel 307 is implemented with a tunneling protocol A and the control process indicates that the egress tunnel 309 is implemented with a tunneling protocol B, then the tunnel process 331 will select the protocol B encapsulation routine 337 to encapsulate the decapsulated payloads of the subscriber session 302. After encapsulation, the forwarding process 329 transmits the subscriber session 302 over the egress tunnel 309 as a new subscriber session 308.

The decapsulation and tunneling routines can be implemented in any number of ways. These processes can be independent processes running on a network element. These independent processes would be governed and managed by a control process. In another implementation, the processes could be threads of a single process. The processes could also be independent modules. Although a number of implementations for this aspect of the invention have been described, they are only described to illustrate examples and not meant to be limiting on the invention.

Figure 4:
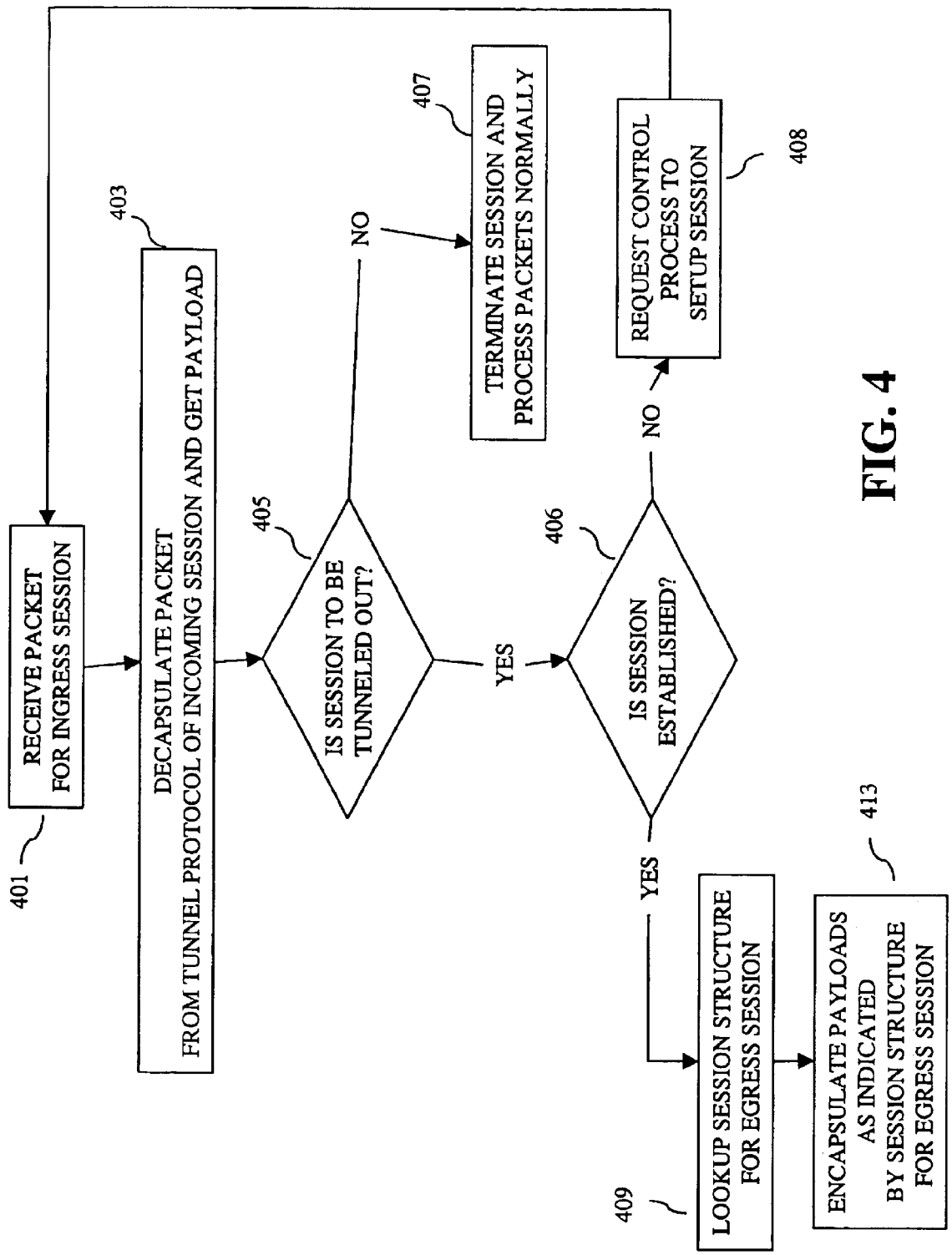
FIG. 4 is a flowchart for switching a session between two different tunneling protocols according to one embodiment of the invention.

FIG. 4 is a flowchart for switching a session between two different tunneling protocols according to one embodiment of the invention. At block 401 of FIG. 4, a packet is received over a session of an ingress tunnel. The network element decapsulates a payload from the packet of the session being transmitted over the tunnel with a first tunneling protocol at block 403. At block 405, the network element determines if the session is to be tunneled out of the network element. If the session is not to be tunneled out, then at block 407 the network element terminates the session and processes packets normally. If the session is to be tunneled out, then at block 406 it is determined if the session is established. If the session is not established, then at block 408 a request is made for the control process to establish the session. After block 408, control flows to block 401. If the session is established, then at block 409 looks up the session structure for the egress session. The session structure indicates the egress tunnel and the encapsulation of the egress tunnel. At block 413, the network element encapsulates the decapsulated packets of the ingress session as indicated by the created session structure for the egress tunnel at block 413.

In an alternative embodiment, the network element would have a table indicating supported tunneling protocols and their location. Functions or routines for some protocols would be supported locally while other protocols would be supported remotely. The owner of the network element could conserve memory while expanding protocol support by selecting a limited number of popular or frequently encountered tunneling protocols to be supported locally. The functions and routines to perform encapsulation and decapsulation for these selected protocols would be stored as images or modules locally. Additional protocols would be supported remotely by storing the decapsulation and encapsulation routines for these additional protocols on remote servers. If a locally supported protocol is needed for encapsulation or decapsulation, the network element could execute or call the functions or routines for the locally supported protocol. If a remotely supported protocol is needed for encapsulation or decapsulation of network traffic, the network element could remotely execute the functions or routines or temporarily import images or files to perform encapsulation and/or decapsulation.

Tunnel interworking enables a network provider (or other entity with a need for this ability) to carry network traffic between different tunneling protocols. The network provider can provide service to ISP customers regardless of the tunneling protocol received and the tunneling protocol selected by the ISP customer. A telecom acting as a network provider can avoid the complex task of adding protocol support to existing network elements with a single network element. The telecom's network infrastructure can still use the protocol supported on their network elements. Instead of recertifying and installing new or upgraded protocol support at each network element in the telecom's network infrastructure, the telecom can install a network element implementing the invention at an access point between the telecom network and a service provider's network.

The techniques shown in the figures can be implemented using code and data stored and executed on computers. Such computes store and communicate (internally and with other computers over a network) code and data using machine-readable media, such as magnetic disks; optical disks; random access memory; read only memory; flash memory devices; electrical, optical, acoustical or other form of propagated signals (e.g., carrier waves, infrared signals, digital signals, etc.); etc. Of course, one or more parts of the invention may be implemented using any combination of software, firmware, and/or hardware.

While the invention has been described interms of several embodiments, those skilled in the art will recognize that the invention is not limited to the embodiments described.

The method and apparatus of the invention can be practiced with modification and alteration within the spirit and scope of the appended claims. The description is thus to be regarded as illustrative instead of limiting on the invention.

We claim:

1. A computer implemented method comprising:
    receiving at a first network element of a network a subscriber session from a subscriber;
    routing at least a portion of the subscriber session to a second network element within the network using a first tunneling protocol;
    determining at the second network element whether the subscriber session should be routed to a destination using a second tunneling protocol different than the first tunneling protocols;
    switching the subscriber session to the destination out of the network via the second network element using the second tunneling protocol if the subscriber session should be routed to the destination using the second tunneling protocol; and
    authenticating the subscriber session based on authentication, authorization, and accounting (AAA) information associated with the subscriber, and wherein the AAA information further includes information regarding whether the subscriber session should be switched out and which tunneling protocol should be used when a set of packets is routed to the destination.

2. The method of claim 1 wherein switching the subscriber session comprises:
    the second network element decapsulating the subscriber session to extract a payload of the subscriber session according to the first tunneling protocol;
    the second network element encapsulating the extracted payload of the subscriber session with the second tunneling protocol; and
    the second network element transmitting the encapsulated subscriber session to the destination out of the network.

3. The method of claim 2 wherein encapsulating the extracted payload comprises
    the second network element remotely invoking an encapsulation process from a third network element within the network to encapsulate the payload of the subscriber session using the second tunneling protocol, if the second network is not capable of handling the second tunneling protocol.

4. The method of claims 2 wherein decapsulating the subscriber session comprises the second network element remotely invoking a decapsulation process from a third network element within the network to decapsulate the subscriber session according to the first tunneling protocol, if the second network element is not capable of handling the first tunneling protocol.

5. A computer implemented method comprising:
    receiving at a second network element of a network a session encapsulated with a first tunneling protocol from a first network element within the network, the session having a control message;
    the second network element decapsulating the encapsulated session to extract the control message according to the first tunneling protocol;
    using the control message to determine if the session is to be transmitted with a second tunneling protocol different than the first tunneling protocol;
    if the session is to be transmitted with the second tunneling protocol, creating a session structure indicating the second tunneling protocol associating the session with the session structure;
    transmitting the session as indicated by the session structure to a destination, wherein the session is encapsulated with the second tunneling protocol based on the protocol information stored within the session structure prior to transmitting the session to a destination; and
    authenticating the session based on authentication, authorization, and accounting (AAA) information associated with a subscriber, and wherein using the control message to determine if the session is to be transmitted with the second tunneling protocol comprises: retrieving a subscriber record from a database, the subscriber record including authentication, authorization, and accounting information and the record corresponding to a subscriber indicated by the control message; determining whether the session is to be tunneled out and which tunneling protocol should be used when the session is tunneled out, based on the record.

6. The method of claim 5 further comprising:

encapsulating the session with the second tunneling protocol determined from the record;

transmitting the encapsulated session to a destination, wherein the session is decapsulated according to the second tunneling protocol at the destination.

7. A computer implemented method comprising:

receiving at a second network element of a network a subscriber session with a first tunneling protocol from a first network element within the network;

the second network element determining that the subscriber session is to be transmitted with a second tunneling protocol different than the first tunneling protocol;

associating the subscriber session with a session structure, the session structure indicating the second tunneling protocol;

transmitting the subscriber session as indicated by the session structure to a destination, wherein the subscriber session is encapsulated using the second tunneling protocol indicated by the session structure; and authenticating the subscriber session based on authentication, authorization, and accounting (AAA) information associated with a subscriber, and wherein the AAA information further includes the session structure regarding whether the subscriber session should be switched out and which tunneling protocol should be used when a set of packets is routed to the destination.

8. The method of claim 7 wherein determining if the subscriber session is to be transmitted with a second tunneling protocol comprises:

retrieving a set of data corresponding to the subscriber session, the set of data indicating the subscriber session is to be tunneled out.

9. The method of claim 7 wherein associating the subscriber session with the session structure comprises processing the subscriber session as indicated by the session structure.

10. A computer implemented method comprising:

receiving at a second network element of a network a subscriber session encapsulated with a first of a plurality of tunneling protocols from a first network element within the network;

the second network element determining that the subscriber session is to be transmitted with a second of the plurality of tunneling protocols different than the first tunneling protocol;

the second network element creating a session structure, the session structure indicating the second of the plurality of tunneling protocols;

transmitting the subscriber session as indicated by the session structure to a destination, wherein the subscriber session is encapsulated using the second tunneling protocol indicated by the session structure; and authenticating the subscriber session based on authentication, authorization, and accounting (AAA) information associated with a subscriber, and wherein the AAA information further includes information regarding whether the subscriber session should be switched out and which tunneling protocol should be used when a set of packets is routed to the destination.

11. The method of claim 10 wherein the first of the plurality of protocols is one of a compulsory and voluntary tunneling protocol.

12. The method of claim 10 wherein the second of the plurality of protocols is a compulsory tunneling protocol.

13. The method of claim 10 further comprising determining whether the second of the plurality of tunneling protocols is supported locally, and to access the second of the plurality of protocols from a remote server if not supported locally.

14. A network element comprising a circuit to receive a subscriber session, the subscriber session being encapsulated with a first tunneling protocol and received from a remote network element within a network;

a logic to determine if the subscriber session is to be transmitted with a second tunneling protocol different than the first tunneling protocol, to encapsulate the subscriber session with the second tunneling protocol if the logic determines that the subscriber session is to be transmitted with the second tunneling protocol, to transmit the subscriber session encapsulated with the second tunneling protocol to a destination out of the network; and to authenticate the subscriber session based on authentication, authorization, and accounting (AAA) information associated with a subscriber, and wherein the AAA information further includes information regarding whether the subscriber session should be switched out and which tunneling protocol should be used when a set of packets is routed to the destination.

15. The network element of claim 14 wherein the logic to determine if the session is to be transmitted with the second tunneling protocol comprises:

a control module to retrieve a set of data corresponding to the session, the set of data indicating the session is to be tunneled out; and a tunnel module to associate the session to a session structure, the session structure indicating the second tunneling protocol.

16. The network element of claim 14 wherein the first tunneling protocol is one of a compulsory and voluntary tunneling protocol.

17. The network element of claim 14 wherein the second tunneling protocol is a compulsory tunneling protocol.

18. A network element comprising:

a tunnel decapsulation module to decapsulate a subscriber session received over an ingress tunnel according to a first of a plurality of protocols from a remote network element of a network;

a payload decapsulation module coupled to said tunnel decapsulation module to decapsulate a control packet that is part of said subscriber session;

a control process coupled to said payload decapsulation module to determine if said subscriber session is to be transmitted over an egress tunnel that uses a second of said plurality of protocols;

a tunnel module, coupled to said tunnel encapsulation module and said control process, to encapsulate the traffic from said session in the second of said, plurality of protocols used for said egress tunnel; and an authentication module to authenticate the subscriber session based on authentication, authorization, and accounting (AAA) information associated with a subscriber, and wherein the AAA information further includes information regarding whether the subscriber session should be switched out and which tunneling protocol of said plurality of protocols should be used when a set of packets is routed to the destination.

19. The network element of claim 18, wherein:

said control process to also determine whether the second of said plurality of protocols used for said egress tunnel is stored locally, and to access the one of said plurality of protocols from a remote server if the second of said plurality of protocols is not stored locally.

20. The network element of claim 18, wherein said tunnel module includes at least two of said plurality of protocols.

21. An apparatus comprising:

a first network card to receive a set of data, the set of data being encapsulated with a first tunneling protocol received from a remote network element of a network;

a computer to determine if the set of data is to be transmitted with a second tunneling protocol different than the first tunneling protocol and to encapsulate the set of data with the second tunneling protocol if determined the set of data is to be transmitted with the second tunneling protocol and authenticate a subscriber session based on authentication, authorization, and accounting (AAA) information associated with a subscriber, and wherein the AAA information further includes information regarding whether the subscriber session should be switched out and which tunneling protocol should be used when a set of packets is routed to the destination; and a second network card to transmit the encapsulated set of data to a destination out of the network.

22. The apparatus of claim 21 wherein the first tunneling protocol is one of a voluntary and a compulsory tunneling protocol.

23. The apparatus of claim 21 wherein the second tunneling protocol is a compulsory tunneling protocol.

24. A machine readable medium that provides instructions, which when executed by a set of processors, cause said set of processors to perform operations comprising:

receiving at a first network element of a network a subscriber session from a subscriber;

routing at least a portion of the subscriber session to a second network element within the network using a first tunneling protocol;

determining at the second network element whether the subscriber session should be routed to a destination using a second tunneling protocol different than the first tunneling protocol;

switching the subscriber session to the destination out of the network via the second network element using the second tunneling protocol if the subscriber session should be routed to the destination using the second tunneling protocol; and authenticating the subscriber session based on authentication, authorization, and accounting (AAA) information associated with a subscriber, and wherein the AAA information further includes information regarding whether the subscriber session should be switched out and which tunneling protocol should be used when a set of packets is routed to the destination.

25. The machine readable medium of claim 24 wherein switching comprises:

determining the subscriber session is to be transmitted with the second tunneling protocol;

encapsulating the subscriber session with the second tunneling protocol; and transmitting the encapsulated subscriber session.

26. The machine readable medium of claim 24 wherein the first tunneling protocol can be a compulsory tunneling protocol or voluntary tunneling protocol.

27. The machine readable medium of claim 24 wherein the second tunneling protocol is a compulsory tunneling protocol.

* * * * *